(12) United States Patent
Brown et al.

(10) Patent No.: US 6,347,347 B1
(45) Date of Patent: Feb. 12, 2002

(54) MULTICAST DIRECT MEMORY ACCESS STORING SELECTED ONES OF DATA SEGMENTS INTO A FIRST-IN-FIRST-OUT BUFFER AND A MEMORY SIMULTANEOUSLY WHEN ENABLED BY A PROCESSOR

(75) Inventors: Michael K. Brown, Salem, NH (US); Paul Chieffo, Bolton; John J. Platko, Acton, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/465,910

(22) Filed: Dec. 17, 1999

Related U.S. Application Data (60) Provisional application No. 60/143,876, filed on Jul. 15, 1999.

(51) Int. Cl.[7] .............................................. G06F 13/28
(52) U.S. Cl. ............................ 710/23; 710/22; 710/26; 710/52
(58) Field of Search ............................. 710/22, 33, 52, 710/26; 370/428, 429, 474

(56) References Cited

U.S. PATENT DOCUMENTS

| | | | | |
|---|---|---|---|---|
| 5,398,245 A | * | 3/1995 | Harriman, Jr. | 370/389 |
| 5,488,724 A | * | 1/1996 | Firoozmand | 709/212 |
| 5,651,002 A | * | 7/1997 | Seters et al. | 370/392 |
| 6,173,333 B1 | * | 1/2001 | Jolitz et al. | 709/240 |

* cited by examiner

Primary Examiner—Thomas Lee
Assistant Examiner—Iiwoo Park
(74) Attorney, Agent, or Firm—Weingarten, Schurgin, Gagnebin & Lebovici LLP (57) ABSTRACT

A data transfer technique employs direct memory access (DMA) logic to transfer data to a memory and simultaneously store the data into a buffer that is closely coupled to a processor, enabling the processor to access the data quicker than if accesses to the memory were required. The simultaneous transfer is selectively enabled and disabled by the processor, so that only those portions of the data that are actually needed by the processor are stored into the buffer. The technique is used on a network interface card (NIC), in conjunction with host memory interface logic that transfers packets and packet descriptors from host memory to memory on the NIC. The DMA logic is controlled through the use of DMA descriptors residing on ring data structures in the NIC memory. The processor sets the value of a flag in a descriptor to indicate whether the data involved in a DMA transfer is to be written to the buffer.

6 Claims, 4 Drawing Sheets

| Address Range | Size | Description | Access Type |
|---|---|---|---|
| 0x0000_0000  0x000F_FFFF | 1 MB | Internal Rom | burst, stall |
| | | | |
| 0x0130_0000  0x1FFF_FFFF | | reserved  120 | burst, stall |
| 0x2000_0000  0x200F_FFFF | 1 MB | Internal ROM | burst, no stall |
| 0x2130_0000  0x3FFF_FFFF | | reserved  122 | burst, no stall |
| 0x4000_0000  0x400F_FFFF | 1 MB | Internal ROM | single, stall |
| 0x4130_0000  0x5FFF_FFFF | | reserved  124 | single, stall |
| 0x6000_0000  0x600F_FFFF | 1 MB | Internal ROM | single, no stall |
| 0x6130_0000  0x7FFF_FFFF | | reserved  126 | single, no stall |
| 0x8000_0000  0x9FFF_FFFF | .5GB | processor core Data RAM (DARAM)  114 | |
| 0xA000_0000  0xAFFF_FFFF | .25GB | processor core Data RAM (DARAM) snoop buffer  116 | |
| 0xB000_0000  0xBFFF_FFFF | .25GB | Int. vec & clear reg. | |
| 0xC000_0000  0XFFFF_FFFF | 1GB | processor core Instruction RAM (IRAM) | |

MULTICAST DIRECT MEMORY ACCESS STORING SELECTED ONES OF DATA SEGMENTS INTO A FIRST-IN-FIRST-OUT BUFFER AND A MEMORY SIMULTANEOUSLY WHEN ENABLED BY A PROCESSOR

CROSS REFERENCE TO RELATED APPLICATIONS

This application claims the benefit under 35 U.S.C. §119 (e) of provisional patent application Ser. No. 60/143,876, filed Jul. 15, 1999 and entitled "Multi-Cast DMA—A Method for Reducing Bandwidth and Processing Overhead in Digital Systems."

STATEMENT REGARDING FEDERALLY SPONSORED RESEARCH OR DEVELOPMENT

Not Applicable

BACKGROUND OF THE INVENTION

The invention is related to the field of processors, and in particular to processors utilizing direct memory access (DMA) logic to obtain data from an external entity such as memory associated with another processor.

In processing systems, there is commonly a need to transfer a segment of data from one processing entity to another. For example, in computer systems it is common for a host processor to communicate with input/output (I/O) processors through data structures residing in host memory. One of the processors creates a message for the other processor in host memory, and then notifies the other processor. The other processor then reads the message from host memory. In the case of I/O operations, the message may include data being transferred between the host and an I/O port such as a network interface. In such a case the data may be temporarily buffered in a separate memory forming part of the network interface, and an I/O processor in the network interface is responsible for transferring the data between the I/O port (e.g., network segment) and the host memory. Such systems commonly employ direct memory access (DMA) logic programmed by the interface processor to move the data between the host memory and the interface memory.

In a system like that described, in which an I/O processor (with or without DMA logic) is responsible for moving data between host memory and an external data source/sink such as a network segment, the processor often must examine part of the data in order to take appropriate action with the remainder of the data. An I/O processor in a network interface, for example, may need to examine a header portion of packets being transferred between the host memory and a network segment, to determine if any special action is required with respect to the packets. Such an interface is commonly referred to as a "intelligent" interface, because the I/O processor is capable of performing complex functions in addition to controlling the transfer of data.

In accordance with one known technique, DMA logic is used to transfer a collection of data such as a packet to the interface memory, and then the I/O processor accesses the data as necessary by directly accessing the interface memory. While this approach has the benefit of simplicity, it nonetheless suffers some drawbacks. Accesses by the I/O processor represent demand for the bandwidth resources of the interface memory. Also, the latency of the interface memory may be relatively high from the perspective of the I/O processor, so performance can be negatively affected.

It is also possible to employ two sets of DMA logic, one to transfer data between the host and the interface memory, and another to transfer the data between the interface memory and the I/O processor. This technique also places a load on the bandwidth resources of the interface memory, and requires the I/O processor to carry out the overhead task of controlling the second DMA operation. Both of these have negative performance impacts.

It would be desirable to achieve improved performance in systems having intelligent I/O interfaces, such as intelligent network interface cards.

BRIEF SUMMARY OF THE INVENTION

In accordance with the present invention, a technique for transferring data into a memory is disclosed that enables a processor coupled to the memory to enjoy rapid access to selected portions of the data.

In the disclosed data transfer technique, DMA logic transfers data to a memory and simultaneously stores the data into a buffer that is closely coupled to a processor. The processor can access the data from the buffer much more quickly than the data in the memory, so performance is improved. The simultaneous transfer can be selectively enabled and disabled by the processor, so that only those portions of the data that are actually needed by the processor are stored into the buffer. In one embodiment, the technique is part of a processing system on a network interface card (NIC), and is used in conjunction with host memory interface logic during transfers of packets and packet descriptors from host memory to memory on the NIC. The DMA logic is controlled through the use of DMA descriptors residing on ring data structures in the NIC memory. The processor indicates whether the data segment involved in a transfer is to be written to the buffer by setting an appropriate flag indicator in the descriptor for the transfer. By this mechanism, the processor obtains fast access to important data such as packet headers and descriptors from host memory, so that packet processing performance is improved.

Other aspects, features, and advantages of the present invention are disclosed in the detailed description that follows.

DETAILED DESCRIPTION OF THE INVENTION

Figure 1:
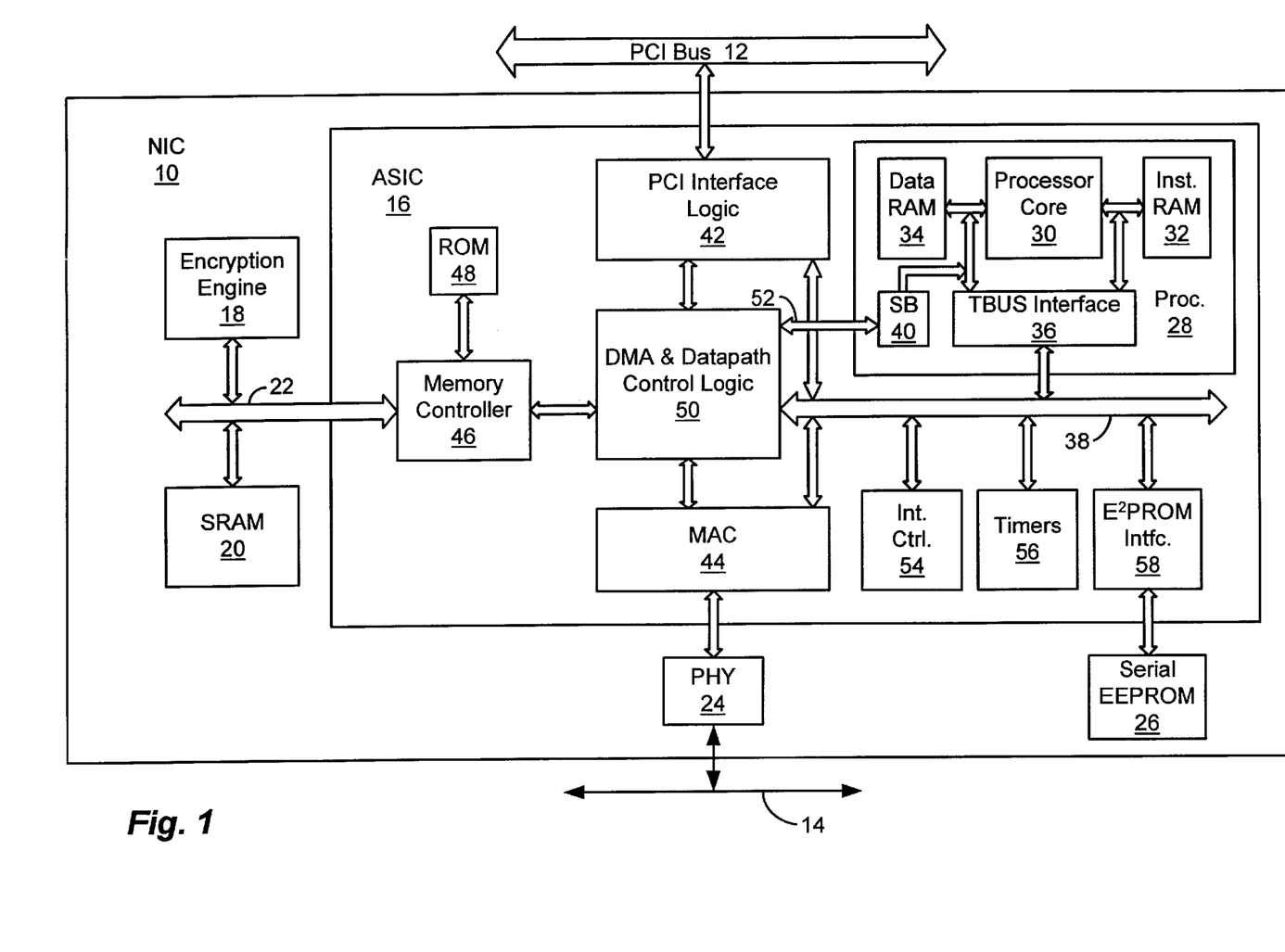
FIG. 1 is a block diagram of a network interface card (NIC) having a processor operating according to the present invention.

FIG. 1 shows a block diagram of a network interface card (NIC) 10. As shown, the NIC 10 is intended for connection between a system I/O bus, such as a Peripheral Components Interconnect (PCI) bus 12, and an Ethernet network segment 14. The NIC 10 includes an application-specific integrated circuit (ASIC) 16 having an internal structure described below. The ASIC 16 is connected to static random access memory (SRAM) 20 by a memory bus 22. An optional encryption engine co-processor 18, which in one embodiment can be the so-called Sidewinder IC from VLSI Technology, Inc., of San Jose, Calif., can also be connected to the memory bus 22. The ASIC 16 is also connected to PHY circuitry 24 that implements a physical layer interface to the Ethernet segment 14. An electrically erasable programmable read only memory (EEPROM) 26 is also connected to the ASIC 16.

The ASIC 16 is a highly integrated processing subsystem specially tailored for network interface applications. It includes a processor 28, which in a preferred embodiment employs a processor core 30 known as the ARM9, developed by ARM, Ltd. of Cambridge, England. The processor 28 includes a 32 Kb instruction RAM 32, a 16 Kb data RAM 34, and interface logic 36 for interfacing to an internal data bus 38 referred to as the "T Bus". The processor 28 also contains a 512 byte buffer 40 referred to as a "snoop buffer" or SB, which is described below.

The ASIC 16 also contains PCI interface logic 42 for interfacing to the external PCI bus 12, and media access control (MAC) logic 44 for interfacing to the external PHY logic 24. As shown, the PCI interface logic 42 and MAC logic 44 have connections to the T Bus 38. A memory controller 46 controls the SRAM 20 and the memory bus 22, and also controls access to an on-chip read only memory (ROM) 48. Direct memory access (DMA) and datapath control logic 50 provides connectivity and data movement among the PCI interface logic 42, MAC 44, memory controller 46, and T Bus 38. The DMA and datapath control logic 50 is also connected to the snoop buffer 40 by a separate bus 52. The ASIC 16 also includes interrupt control logic 54, timer logic 56, and E$^2$PROM interface logic 58 connected to the T Bus 38. The E$^2$PROM interface logic provides an interface to the off-chip EEPROM 26.

The T Bus 38 uses separate 32-bit unidirectional buses for data movement to and from connected elements. More specifically, three 32-bit buses carry data from the processor 28 to the PCI interface logic 42, the DMA and datapath control logic 50, and the MAC logic 44 respectively. Also, three 32-bit buses carry data to the processor 28 from respective ones of these logic blocks. The processor 28 is the only "master" on the T Bus 38, meaning that it is the only device that can initiate data transfers. The PCI interface logic 42, the DMA and datapath control logic 50, and the MAC logic 44 all interface to the T Bus 38 as slave devices, as do the interrupt control logic 54, the timer logic 56, and the E$^2$PROM interface logic 58.

The NIC 10 of FIG. 1 operates generally to move packets between the network segment 14 and a host memory that is accessible via the PCI bus 12. All packets either transmitted or received are temporarily buffered in the SRAM 20. The host system communicates with the NIC 10 via data structures referred to as "rings" residing in host memory. Similarly, the processor 28 controls the movement of packets into and out of the SRAM 20 using rings residing in the SRAM 20.

For packets being transmitted, a transmit DMA controller within the DMA and datapath logic 50 is programmed by the processor 28 to obtain a packet and an accompanying packet descriptor from a ring in host memory, and transfer the packet and descriptor to a ring in the SRAM 20. As part of this operation, the DMA controller can load the snoop buffer 40 with data that is being downloaded from the host memory to the SRAM 20. In particular, the DMA controller is programmed to load descriptors into the snoop buffer 40 as they are being transferred from the host into the SRAM 20. This feature enhances performance by enabling the processor to have fast access to descriptors.

Once these items have been transferred to the SRAM 20, the processor 28 examines the descriptor and decides what to do with the packet. Any of a variety of functions may be performed, including for example adding a Virtual Local Area Network (VLAN) tag to the packet, or performing a filtering operation so that only selected packets from the host are sent on the Ethernet segment 14.

For packets to be transmitted to the Ethernet segment 14, the processor 28 builds a new descriptor pointing to the packet data already in the SRAM 20, places the descriptor on a ring in the SRAM 20 used for outgoing packets, and programs a DMA engine within the DMA and datapath logic 50 to transfer the packet to the MAC 44. The MAC 44 transfers the packet data to the PHY circuitry 24, which transmits the packet as a series of bits on the Ethernet segment 14.

For packets received from the Ethernet segment 14, the processing is generally the reverse of that described above. The DMA and datapath logic 50 includes separate receive DMA engines that are responsible for moving packets from the MAC to the SRAM 20, and for moving packets and descriptors between the SRAM 20 and the host memory residing on the PCI bus 12. The processor 28 examines the descriptors of received packets to perform any special processing that may be required and to decide whether the packet is to be passed on to the host. For example, the processor 28 may implement some type of filtering for received packets, so that packets are selectively dropped rather than being forwarded to the host.

Figure 2:
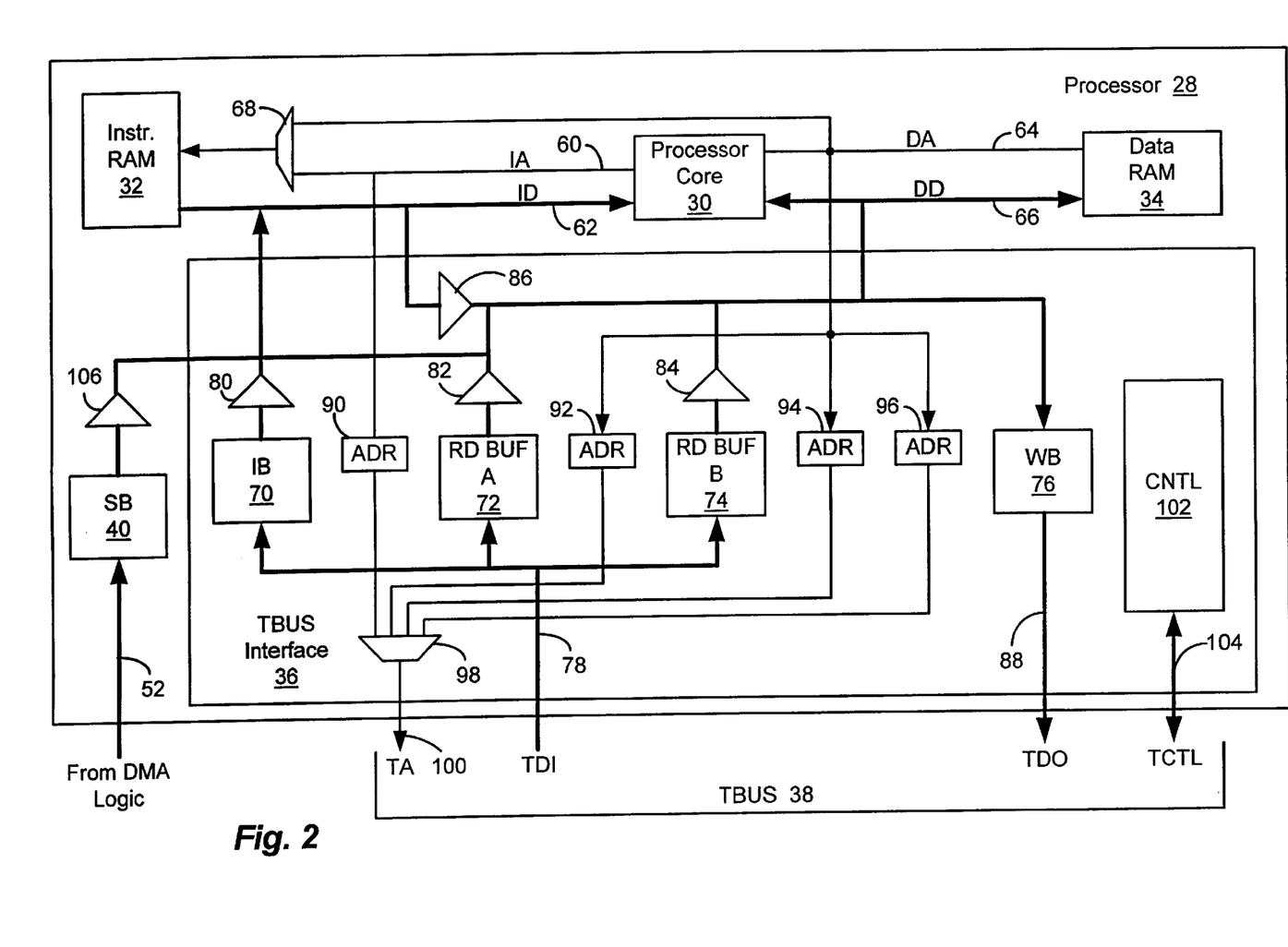
FIG. 2 is a block diagram of the processor in the NIC of FIG. 1.

FIG. 2 shows the processor 28 in more detail. The processor core 30 interfaces with the instruction RAM 32 via an instruction address (IA) bus 60 and an instruction data (ID) bus 62. Also, the processor core 30 interfaces with the data RAM 34 via a data address (DA) bus 64 and a data data (DD) bus 66. The DD bus 66 is connected as a data input to the instruction RAM 32, and a multiplexer 68 is used to select either the IA bus 60 or the DA bus 64 as the source of the address to the instruction RAM 32. This configuration enables the processor core 30 to load operational code into the instruction RAM 32 by performing data store operations into an appropriate address space.

The T Bus interface logic 36 includes an 8-entry instruction prefetch buffer (IB) 70, two 8-word read buffers labeled read buffer A (RD BUF A) 72 and read buffer B (RD BUF B) 74, and a 4-word write buffer (WB) 76. The IB 70 and the read buffers 72 and 74 are loaded from a T Bus Data In (TDI) bus 78. The output of the IB 70 can be selectively driven onto the ID bus 62 via a bus driver 80. The outputs of the read buffers 72 and 74 can be selectively driven onto the DD bus 66 via respective bus drivers 82 and 84. Also, the value on the ID bus 62 can be selectively driven onto the DD bus 66 via a bus driver 86, a function that is used when executing instructions that contain immediate data. The WB 76 is loaded from the DD bus 66, and provides its output to the T Bus 38 on a T Bus Data Out (TDO) Bus 88.

The IB 70, read buffers 72 and 74, and WB 76 have associated address registers 90, 92, 94 and 96 respectively that are used to temporarily store address values when reading or writing data to/from the T Bus 38. As shown, the IB address register 90 is loaded from the IA bus 60, while the remaining three address registers 92, 94 and 96 are loaded from the DA bus 64. The outputs of these address registers are provided as inputs to a multiplexer 98, whose output is provided to the T Bus 38 on a T Bus Address (TA) bus 100. The address register 96 associated with the WB 76 contains multiple storage locations, one for each of the four entries in the WB 76. The address and data from a given store operation advance together through the address register 96 and WB 76 until written to the TBUS 38 as part of a corresponding write transaction.

The T Bus interface logic 36 also contains control logic 102 that controls the movement of data between the T Bus 38 and the various components such as the IB 70, read buffers 72 and 74, WB 76, address registers 90, 92, 94 and 96, and multiplexer 98. This control logic interfaces to the T Bus 38 via various control lines (TCTL) 104. These control lines carry signals such as a clock, a request signal for initiating data transfers, an acknowledge signal for completing transfers, byte enable signals for performing sub-word transfers, and signals indicating whether a transfer is a read or write and whether a single word or a burst of multiple words are involved.

Also shown in FIG. 2 is the snoop buffer 40, which is loaded from the bus 52 from the DMA and datapath logic 50 of FIG. 1. The output of the snoop buffer 40 is selectively driven onto the DD bus 66 via a bus driver 106, so that data from the snoop buffer 40 can be transferred to the data RAM 34 as part of a write transaction.

Figure 3:
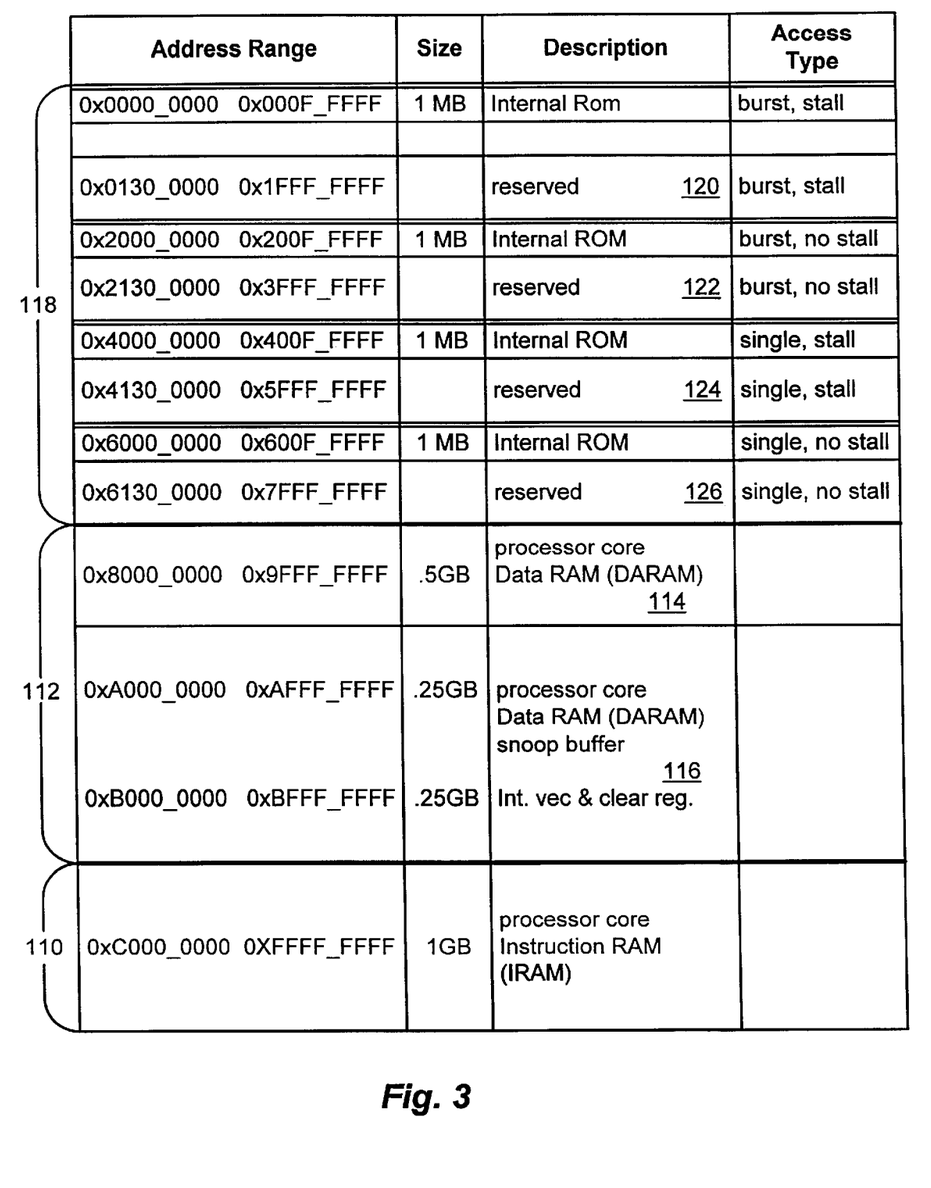
FIG.3 is a drawing of a memory map for the processor of FIG. 2.

FIG. 3 shows a memory map indicating the manner in which various segments of the 4 GB address space of the processor core 30 are used. This address space is shared by instructions and data. The memory map is designed to facilitate single cycle access to the instruction RAM 32 and the data RAM 34, and to enable flexible access to resources connected to the T Bus 38.

Referring to FIG. 3, an address region 110 occupying the top 1 GB of the processor address is used for instructions stored in the instruction RAM 32. Bits [31:30] of the address must decode as 11 binary to access the region 110. Bits [16:2] of the address are provided as the address to the instruction RAM 32, and bits [29:17] are ignored. Therefore, the instruction RAM 32 aliases throughout the address region 110.

The next-lower 1 GB address region 112 is used for data stored in the data RAM 34. Bits [31:30] of the address must decode as 10 binary to access the region 112. Bits [12:2] of the address are used to address the data RAM 34. Bit [29] selects either an upper half 116 or a lower half 114 of the region 112, to identify whether transfers involve the snoop buffer 40 as described below. Bits [28:13] are ignored. Therefore, the data RAM 34 aliases throughout the address region 112.

Accesses to the lower region 114 of the region 112 are treated as normal accesses, i.e., data is either written to or read from the data RAM 34 at the address specified by address bits [12:2]. Writes to the upper region 116 cause the first word of the snoop buffer 40 to be written into the data RAM 34 at the address specified by address bits [12:2]. Also, the snoop buffer is "popped", i.e., the contents are moved forward by one location, to bring the next sequential word to the front for subsequent transfer to the data RAM 34. As shown, this functionality is available in only the lower half of the upper region 116, i.e., when address bit [28] equals 0. The upper half of the region 116 is used for interrupt control functions.

The bottom 2 GB region 118 is used for accesses to the T Bus 38. The T Bus interface logic 36 detects accesses to this region, and for each access takes one of several possible actions depending on whether the access is an instruction access, a data store (write), or a data load (read). These scenarios are discussed in turn below.

When the processor core 30 generates an address on the IA bus 60 that falls in the T Bus address region 118, the address is compared with the address stored in the instruction buffer address register 90 to determine whether the instruction resides in the IB 70. If so, the instruction is returned to the processor core 30 on the ID bus 62. If not, the processor core 30 is stalled, the new address is loaded into the address register 90, and a T Bus read transaction is performed to obtain an aligned 8-word block that contains the desired instruction.

It will be noted that the address region 118 is divided into four equal-sized sub-regions 120, 122, 124 and 126. The physical memory in the region 118 is aliased in all four sub-regions 120, 122, 124 and 126, i.e., the same physical data can be accessed in any one of these four regions. For instruction accesses, operation of the TBUS interface logic 36 is the same. Within each sub-region, the lowest 1 MB is allocated for accesses to the ROM 48 of FIG. 1. Thus, depending on the address of the request, the block that is the subject of the T Bus read transaction may be obtained from the ROM 48, or from the off-chip SRAM memory 20. In either case, when the 8-word block has been returned and loaded into the IB 70, the desired instruction is returned to the processor core 30 via the ID bus 62, and the processor core 30 is unstalled so that program execution can resume.

When the processor core 30 performs a store operation in address region 118, the data and address are stored in the WB 76 and address register 96 if not full. If the WB 76 and address register 96 are full, the processor core 30 is stalled until at least one entry in the WB 76 and address register 96 has become empty. At such time, the data and address are stored in the WB 76 and address register 96, and the processor core 30 is unstalled. Whenever the WB 76 and address register 96 are non-empty, the T Bus interface logic 36 generates a write transaction on the T Bus 38 to write the data at the front of the WB 76 into the off-chip SRAM 20 at the address at the front of the address register 96. All T Bus writes are one word in length.

When the processor core 30 performs a load operation in address region 118, the data is returned via one of the two read buffers 72 or 74. Operation varies depending on several factors. One factor is the address. Accesses to the different subregions of the region 118 are classified as follows:

| | |
|---|---|
| Sub-region 120 | Burst, stall |
| Sub-region 122 | Burst, no stall |
| Sub-region 124 | Single, stall |
| Sub-region 126 | Single, no stall |

A "burst" access results in an aligned 8-word block being obtained from the T Bus 38 and stored into one of the read buffers 72 or 74. In contrast, a "single" access involves only a single word or smaller data unit. The "stall" access is a normal data request, in response to which the T Bus logic 36 stalls the processor core 30 until the requested data is available in a read buffer 72 or 74. In contrast, "no stall" accesses are artificial requests used to signal the T Bus interface logic 36 that a word or a block should be prefetched and placed in one of the read buffers 72 or 74. These different operations are described in turn below.

For load operations in the (Single, stall) space 124, the read buffers 72 and 74 are checked to determine whether either one holds the requested data. If the data is found in one of the read buffers 72 or 74, the data is returned to the processor core 30 and the buffer is "cleared", i.e., marked "Available".

If the requested data is not in either read buffer 72 or 74, the processor core 30 is stalled. One of the read buffers 72 or 74 is then allocated to receive the requested data from the SRAM 20. Each read buffer 72 and 74 has an associated state, which may be "Busy" or "Available". The allocation of a read buffer 72 or 74 for a given request depends on their respective states as follows:

| Read Buffer A | Read Buffer B | Selection |
|---|---|---|
| Available | Available | Read Buffer A |
| Busy | Available | Read Buffer B |
| Available | Busy | Read Buffer A |
| Busy | Busy | Read Buffer A is used upon completion of the request that made Read Buffer A busy. |

After one of the read buffers 72 or 74 has been selected, a single word read transaction is initiated on the T Bus 38. After the requested data is returned and stored in the selected read buffer, the buffer is marked valid, the data is returned to the processor core 30, and the processor core 30 is unstalled. Finally, the read buffer that was used for the load is marked "Available".

Load operations in the (Burst, stall) space 120 proceed in the same manner as for operations in the (Single, stall) space 124, except that an aligned 8-word block including the requested data is requested on the T Bus 38 and stored into the selected read buffer 72 or 74. Also, the read buffer is not flushed until the most significant word in the read buffer is accessed by the processor core 30 using a (Single, stall) request. If the address for a (Burst, stall) load operation is for the most significant word in the block, the selected read buffer is flushed as soon as the data is returned to the processor core 30.

Load operations in the (Single, no stall) space 126 cause a read buffer 72 or 74 to be allocated as described above, and also cause a single word read transaction to be initiated on the T Bus 38. However, the processor core 30 is not stalled. The state of the DD bus 66 is undefined. However, it is assumed that the results of this read are not used by the program executing in the processor core 30. Rather, it is expected that at a later time the processor core 30 performs a (Single, stall) request for the same address to actually retrieve the desired data, which in general should reside in one of the read buffers 72 or 74 as a result of the preceding (Single, no stall) operation.

Load operations in the (Burst, no stall) space 122 are similar to those in the (Single, no stall) space 126, except that an aligned 8-word block is requested over the T Bus 38 and placed in the allocated read buffer 72 or 74. The allocated read buffer is not flushed until the most significant word in the buffer is accessed by the processor core 30 using a (Single, stall) operation.

As previously mentioned, data transfer between the host memory and the SRAM 20 is carried out by a DMA engine within the DMA and datapath control logic 50 of FIG. 1. The DMA engine supports a multi-packet multi-fragment operation in which descriptors representing packets and command blocks are built in the SRAM 20. All descriptors are stored in a ring in the SRAM which is managed by the processor 28. The DMA engine processes valid entries on the ring to perform data transfers between the host and SRAM 20 and generates interrupts to the processor 28 to signal completion when required.

Figure 4:
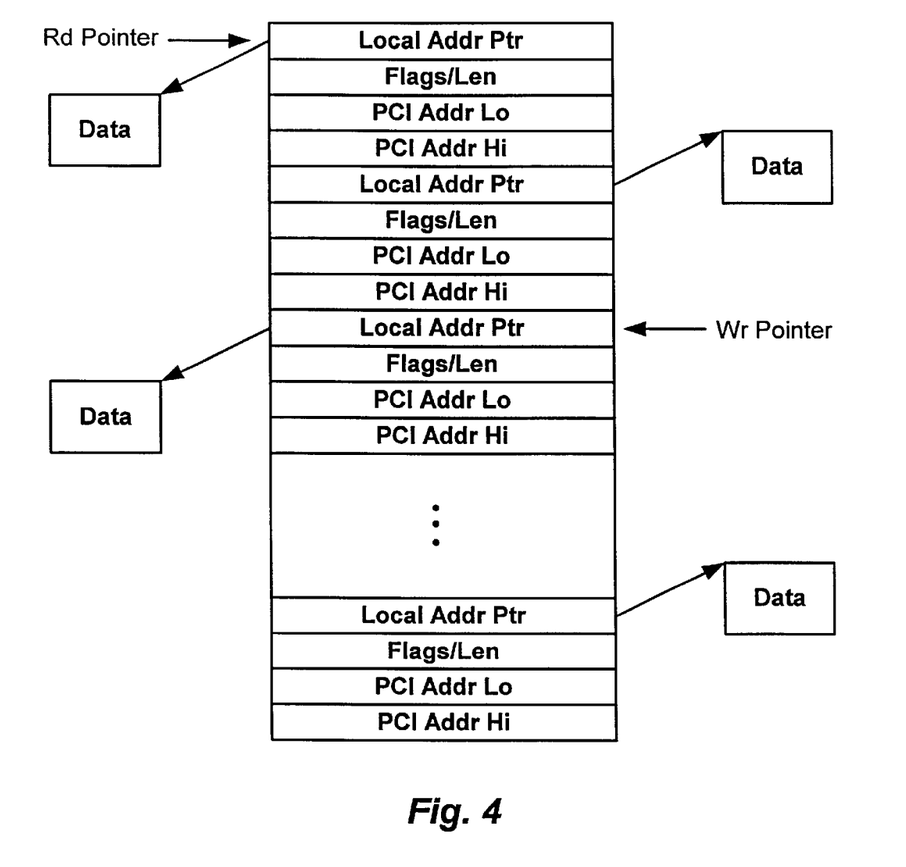
FIG. 4 is a diagram of a direct memory access (DMA) descriptor used by the processor of FIG. 2 to control the transfer of data between the NIC of FIG. 1 and memory in a host computer in which the NIC resides.

FIG. 4 shows the structure of a descriptor ring in the SRAM 20. Each descriptor occupies four aligned 32-bit words in the SRAM 20, and contains (1) a local memory address (i.e. address for SRAM 20) for a fragment, (2) control information used by a DMA channel (described below), (3) length of the fragment, and (4) 64-bit PCI address. The DMA engine reads each descriptor along the ring from the SRAM 20 into internal working registers (described below) to complete data movement.

The DMA engine has four unidirectional DMA channels, two of which are dedicated to transferring blocks of data from the PCI (i.e., host memory) to the SRAM 20, and two of which are used for transferring blocks from the SRAM 20 to the PCI. Each DMA channel controls an associated ring of descriptors, which are constructed by the processor 28 in the SRAM 20.

The four DMA channels share five control or working registers, into which corresponding fields from each descriptor is loaded to carry out the desired transfer. These registers are defined as follows:

1. PCI Address(63:32) The upper 32 bits of the physical address presented on the PCI bus 12 during master operations. For 32-bit PCI operations, must be zero.
2. PCI Address(31:0) The lower 32 bits of the physical address presented on the PCI bus 12 during master operations.
3. Local Address(18:0) The 19 bits of the physical address presented to the SRAM 20 during DMA operations.
4. Fragment Length(15:0) The number of bytes in the fragment of data being transferred.
5. Flags (15:0) Control information as described below.

For storage efficiency, the 16-bit Fragment Length and 16-bit Flags registers are located in the same 32-bit word in the descriptor.

Figure 5:
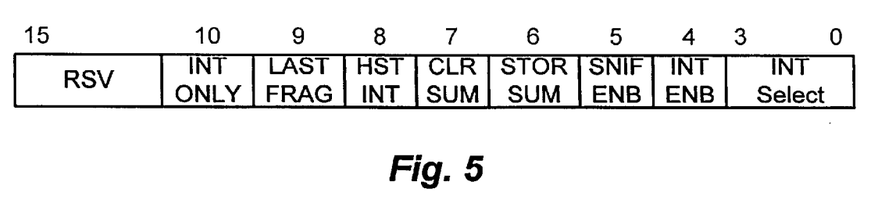
FIG. 5 is a diagram of a flag register used to store flag information from the descriptor of FIG. 4.

FIG. 5 shows the structure of the Flags register. The different fields are defined as follows:

| Bits | Function |
|---|---|
| 3:0 | Identity of a bit in an interrupt status register for the processor 28 that the DMA engine should use to signal completion of the transfer. |
| 4 | When set, indicates that the DMA engine should generate an interrupt to the processor 28 upon completion of the transfer. |
| 5 | When set, indicates that the DMA engine should load the fragment into the snoop buffer while transferring it into the SRAM. |
| 6 | When set, indicates that the DMA engine should store an accumulated IP checksum at the end of the data stream in memory. |
| 7 | When set, indicates that the DMA engine should clear an IP checksum accumulator prior to the data transfer. |
| 8 | When set, indicates that the DMA engine should generate an interrupt to the host processor upon completion of the transfer. |
| 9 | When set, indicates that the current fragment is the last one in the contiguous address space. Alignment logic in the PCI interface 42 monitors this bit to determine when to move an alignment value into the SRAM or host memory. |
| 10 | When set, indicates that the DMA engine should perform a null function on this descriptor and only generate an interrupt. If this bit is set, bit 4 should also be set. |
| 15:11 | Reserved. |

Additionally, each channel contains a separate set of six registers for controlling the associated descriptor ring in the SRAM 20. These registers are as follows:
1. Descriptor Pointer Ring Base Address(18:0) Contains a 19-bit base address of a descriptor ring pointer in the SRAM 20. This register is initialized by the processor 28.
2. Descriptor Pointer Ring End Address(18:0) Contains a 19-bit ending address of the descriptor ring pointer in the SRAM 20. Also initialized by the processor 28.
3. Descriptor Pointer Ring Read Pointer (18:0) Contains an index pointer to the descriptor ring in the SRAM 20. When this pointer differs from the write pointer (below), the DMA channel begins processing descriptors beginning with the descriptor addressed by this pointer.
4. Descriptor Pointer Ring Write Address(18:0) Contains an index pointer to the descriptor ring in the SRAM 20. Updated by processor 28 to initiate DMA operations after descriptors in the SRAM 20 have been constructed.
5. Fragment Pointer Start Address(18:0) Contains a 19-bit starting address of any fragment pointer in the SRAM 20. This register is initialized by the processor 28.
6. Fragment Pointer End Address(18:0) Contains a 19-bit ending address of any fragment pointer in the SRAM 20. This register is initialized by the processor 28.

As mentioned, there are four DMA channels in the DMA engine. The DMA engine arbitrates among the four channels using round-robin arbitration. Once a DMA channel gains control of the PCI bus 12, it completes the entire data movement operation before relinquishing control.

DMA operations generally proceed as follows:
1. The processor 28 constructs the descriptor ring in the SRAM 20 for a given DMA channel.
2. The processor 28 updates the descriptor write pointer to point to the next empty entry.
3. Upon detecting a difference between the read and write pointers, the DMA channel begins reading descriptors one at a time. For each descriptor, the addresses, flags, and length information are loaded into respective ones of the control registers described above, and the DMA channel transfers the entire data fragment. The direction of data flow depends on which DMA channel has been requested to perform the transfer. The DMA channel interrupts the processor 28 or the host CPU if the corresponding flag bit from the descriptor is set. If the SNIF ENB flag bit is set, data being read from the host is written to the snoop buffer 40 at the same time that it is passed to the memory controller 46 for writing to the SRAM 20.
4. Step 3 is repeated for successive descriptors until the read pointer becomes equal to the write pointer.

DMA processing as described herein is particularly advantageous when a packet is scattered in different sections of the host memory. The DMA engine can be programmed to transfer each separate section as a separate operation. Through selective use of the parallel writing of the snoop buffer 40 enabled by t he SNIF ENB bit, the processor 28 obtains necessary pieces of a packet directly rather than via the relatively high-latency SRAM memory 20. For example, one DMA transaction can be used to transfer a packet header from host memory to the SRAM 20. If it is necessary that the processor 28 examine the packet header before the packet is transmitted, the processor 28 can set the SNIF ENB bit for the transfer. The packet header is then loaded into the snoop buffer 40 during the transfer. This mechanism can also be used with other data that may be needed by the processor 28, for example the descriptors for ring entries in the host memory. For those data segments that need not be seen by the processor 28, the SNIF ENB bit in the DMA descriptor can be set to 0, so that the data is not written into the snoop buffer 40. Data segments of a packet generally fall into this category.

When a DMA transfer having the SNIF ENB bit set has completed, the data is transferred from the snoop buffer 40 to the Data RAM 34. This transfer is controlled by software executing in the processor core 30, which executes a series of store operations using addresses in the address region 116 of FIG. 3 using the lower address bits to identify the locations in the Data RAM 34 where the contents of the snoop buffer 40 are to be written. As previously described, the contents of the snoop buffer 40 are read out in first-in-first-out fashion, one word per store operation. Once the data is transferred to the Data RAM 34, it is available for use by the program executing in the processor core 30.

A technique for multi-cast DMA has been described. It will be apparent to those skilled in the art that modifications to and variations of the above-described technique are possible without departing from the inventive concepts disclosed herein. Accordingly, the invention should be viewed as limited solely by the scope and spirit of the appended claims.

What is claimed is:

1. Apparatus for use in a processing system having a processor coupled to a memory, comprising:

a first-in-first-out (FIFO) buffer coupled to the processor and to the memory, the FIFO buffer being operative to provide data stored therein to the processor upon request;

first transfer logic operative to transfer segments of data to the memory from a data source other than the processor, the first transfer logic being further operative when enabled by the processor to store selected ones of the data segments into the FIFO buffer as the selected data segments are being transferred to the memory;

a data memory coupled to the processor and the FIFO buffer; and second transfer logic operative to transfer the selected data segments from the FIFO buffer to the data memory in response to an operation performed by the processor.

2. Apparatus according to claim 1, wherein the processor operation is a data store operation having an address falling within a predetermined address region.

3. Apparatus according to claim 1, wherein the data-transferring and data-storing operations of the first transfer logic are carried out based on information contained in descriptors created by the processor, each descriptor being associated with a corresponding data segment, and wherein the storing of the data segment into the FIFO buffer is enabled when a flag is set in the descriptor for the data segment.

4. A method for providing data to a processor in a processing system having a buffer and a memory coupled to the processor, wherein the buffer is a first-in-first-out (FIFO) buffer, and wherein the processing system has a data memory coupled to the processor and the FIFO buffer, comprising:

transferring segments of data to the memory from a data source other than the processor;

storing selected ones of the data segments into the FIFO buffer as the selected data segments are being transferred to the memory when enabled by the processor; and transferring the selected data segments from the FIFO buffer to the data memory in response to an operation performed by the processor.

5. A method according to claim 4, wherein the processor operation is a data store operation having an address falling within a predetermined address region.

6. A method according to claim 4, wherein the data-transferring and data-storing operations are carried out based on information contained in descriptors created by the processor, each descriptor being associated with a corresponding data segment, and wherein a data segment is stored into the FIFO buffer when a flag is set in the descriptor for the data segment.

* * * * *